United States Patent [19]

Scheetz

[11] 4,391,956

[45] Jul. 5, 1983

[54] IMPACT MODIFIED NYLON 6

[75] Inventor: Howard A. Scheetz, Lancaster, Pa.

[73] Assignee: The Polymer Corporation, Reading, Pa.

[21] Appl. No.: 336,714

[22] Filed: Jan. 4, 1982

[51] Int. Cl.³ .................... C08L 67/02; C08L 77/02
[52] U.S. Cl. .................................................. 525/425
[58] Field of Search ........................................ 525/425

[56] References Cited

U.S. PATENT DOCUMENTS 4,014,957 3/1977 Kirsh et al. .................... 525/425
4,145,372 3/1979 Murray et al. .................... 525/425

*Primary Examiner*—Allan Lieberman
*Attorney, Agent, or Firm*—Richard O. Church

[57] ABSTRACT

An impact modified nylon comprised of 50 to 95 weight percent nylon 6 and 5 to 50 weight percent polyester elastomer.

2 Claims, No Drawings

IMPACT MODIFIED NYLON 6

TECHNICAL FIELD

This invention relates to nylon molding and extrusion resins and, more particularly, to type 6 nylon that is modified to provide higher impact strength and improved melt forming properties.

BACKGROUND

Nylon 6, a polymer of caprolactam, is a well-recognized engineering plastic. As is characteristic of these materials, nylon is strong, it is capable of withstanding considerable abuse, it has low coefficient of friction, long wear life and makes an excellent bearing element. However, due to its stiffness, nylon 6 can fracture under high impact forces and, accordingly, it is a principal object of this invention to provide a modified nylon 6 with a higher impact strength.

A secondary object of this invention is to provide a modified nylon 6 that has a higher melt viscosity and melt strength that makes it easier to melt form as by extrusion and injection molding.

DISCLOSURE OF THE INVENTION

Briefly, these and other objects of this invention are achieved by melt blending from 5 to 50 weight percent of a polyester elastomer with nylon 6. It has been found that these polymers are misceable and compatible above their melting point and, further, the melt viscosity of a melt blend is higher than that of either polymer. This later observation implies that intermolecular reactions take place between the polymers, as by chain branching or chain extension, resulting in an apparent increase in molecular weight.

The addition of polyester elastomers improves the impact properties of the nylon and the increased melt viscosity facilitates melt forming processes. The polymeric blend is easier to extrude, the extrudate has improved ovality and is less subject to cracking during extrusion and annealing, and the surface of the extrudate is unusually smooth. Because of the concentricity and smoothness of the extrudate, it is easier to extrude to desired dimensional tolerances and secondary operations, such as centerless grinding and planing, may often be eliminated. If the blend is extruded in the form of small diameter rods which are chopped to make molding pellets, the smooth surface makes it easier to feed the pellets to extruders and injection molding machines.

The properties of the polymer blend, such as its ability to resist wear, can be improved by heat treating after a shape has been formed which suggests that polymerization can be continued after melt forming an article. Temperatures approaching the melting point, e.g., above about 200° C., are effective to increase the molecular weight over a period of 6 to 24 hours.

It should be noted that the above improved properties are not obtained when a polyester elastomer is added to type 6/6 nylon, the principal type of nylon with which type 6 nylon competes in bearing and wear applications.

Polyester elastomers are unique in that they perform like conventional cross-linked elastomers over a wide temperature range but soften reversibly and flow at elevated temperatures. Consequently, they may be processed as thermoplastics, as by extrusion and other common forming techniques.

Polyester elastomers are block copolymers in which one component is an amorphous chain segment having a relatively low glass transition temperature. These portions of the molecule are referred to as "soft" segments and impart elasticity to the polymer. In addition, to prevent long-range flow, the molecule must form a thermally reversible network structure in which some inter-molecular associations can unite the chains without the covalent cross-links that are common to thermosetting resins or cured rubbers. The portions of the molecule that undergo this type of association are referred to as the "hard" segments. In an article entitled "Mechanical Performance of Polyester Elastomers" presented to the Dutch Association of Plastic Processors in October, 1972, and reported in Overdrukuitplastica, pages 438 through 448 in October of 1973, the polyester elastomers marketed by duPont under the trademark Hytrel are described as being made from a terephthalate, a polyglycol and short chained diols. When these ingredients are reacted to form a high molecular weight polyester copolymer, diol/terephthalate blocks form the crystaline hard segments and the ether glycol/terephthalate units form the soft amorphous phase containing units of ether glycol terephthalate. Polyester elastomers are also marketed by Akzo under the trademark Arnitel.

It was further disclosed in Overdrukuitplastica that Hytrel polyester elastomers are made from three ingredients:
(1) a terephthalate;
(2) a polyglycol such as polytetramethylene ether glycol, polyethylene ether glycol, or polypropylene ether glycol; and
(3) short chain diols like butanediol and ethylene glycol.

When these are reacted to form high molecular weight polymers, the relative proportions of the hard segments to the soft segments will determine the hardness or stiffness of the family member.

EXAMPLE 85 weight percent of a nylon 6 resin was mixed with 15 weight percent of a polyester elastomer (Hytrel 5556 -duPont). The resins were fed through a mixing extruder, melted and extruded at 220° C. in the form of ⅛" strands. The strands had an extremely smooth surface and were chopped into ⅛" lengths to form a molding resin. This molding resin, in turn, was then extruded into a 1" rod. The polymeric blend was much easier to extrude than an unmodified nylon 6 due to its higher melt strength. It not only extruded more readily with very little of the stick-start type of operation usually observed with nylons but also the extruded rod had improved ovality and smoothness and had less tendency to crack during extrusion and subsequent annealing. The smoothness and dimensional tolerance of the rod was sufficiently good that centerless grinding was not required.

A sample of the rod was tested for notched Izod (ASTM D-256). The results indicated that the notched Izod was 1.8 ft.lb./in. as compared to 0.7 ft.lb./in. for a rod made from the unmodified nylon 6 resin. While other engineering plastics, such as ultra-high molecular weight polyethylene have higher impact strengths, considering the greater stiffness and lesser tendency to cold flow and creep, the modified 6 nylon of this invention presents an unusual combination of properties that make it suitable for use in applications in which the general properties of the nylon with improved impact strength are required.

I claim:

1. A method of improving the impact properties of nylon 6, a polymer of caprolactam, which comprises melt blending the nylon with 5% to 50% by weight of a polyester elastomer.

2. An impact modified nylon 6, a polymer of caprolactam, characterized by the melt addition of from 5% to 50% by weight of a polyester elastomer.

* * * * *